INVENTOR.
BENGT GUNNAR MAGNUSSON
BY Hane and Nydick
ATTORNEYS

INVENTOR.
BENGT GUNNAR MAGNUSSON
BY Hane and Nydick
ATTORNEYS

Nov. 19, 1968 B. G. MAGNUSSON 3,412,209

ARRANGEMENT FOR CONTROL OF TELEPHONE SET CUT-OFF RELAYS IN AN AUTOMATIC TELEPHONE SYSTEM

Filed June 9, 1965 3 Sheets-Sheet 3

INVENTOR.
BENGT GUNNAR MAGNUSSON
BY Hane and Nydick
ATTORNEYS 3,412,209

ARRANGEMENT FOR CONTROL OF TELEPHONE SET CUT-OFF RELAYS IN AN AUTOMATIC TELEPHONE SYSTEM

Bengt Gunnar Magnusson, Enskede, Sweden, assignor to Telefonaktiebolaget L M Ericsson, Stockholm, Sweden, a corporation of Sweden Filed June 9, 1965, Ser. No. 462,645
Claims priority, application Sweden, July 8, 1964, 8,309/64
2 Claims. (Cl. 179—16)

ABSTRACT OF THE DISCLOSURE

A conventional automatic telephone system for servicing a plurality of telephone sets has a selector network for establishing connections between the various telephone sets. Each of the telephone sets has associated therewith a cut-off relay of the latching type. Operating in synchronism with the input selector stage (a crossbar selector) of the selector network is a cut-off relay selector (an additional bridge unit of the crossbar selector) for connecting the cut-off relays to a source of controlled current pulses for operating the relays.

The present invention refers to an arrangement for the control of cut-off relays in an automatic telephone exchange.

It is an object of the invention to provide a less expensive means for controlling such relays by eliminating the control lead usually associated with the three-wire through connections associated with each subscriber telephone set.

Briefly, the invention is mainly characterized by including at least one additional selector in the selecting equipment belonging to the telephone exchange. The additional selector is arranged to assist in the control of the cut-off relays for an entire group of telephone sets connected to telephone exchange. In addition, remanent relays are used for the cut-off relays of the telephone sets, whereby selectors intended for through connection of speech branches can be carried out with two-wire through connections.

Figure 1:
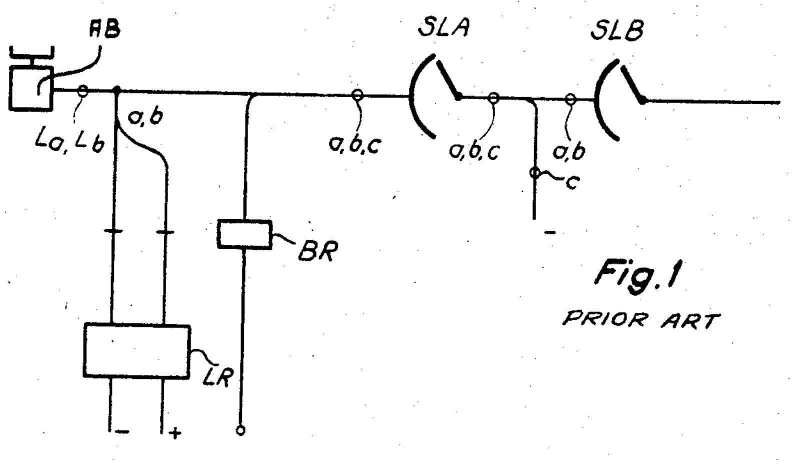
Fig. 1 PRIOR ART
Figure 2:
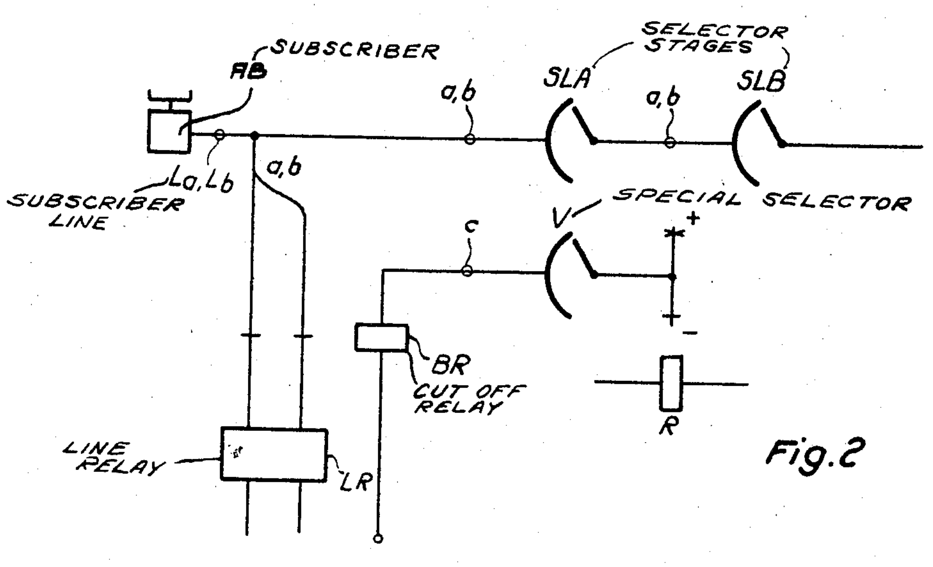
Figure 3:
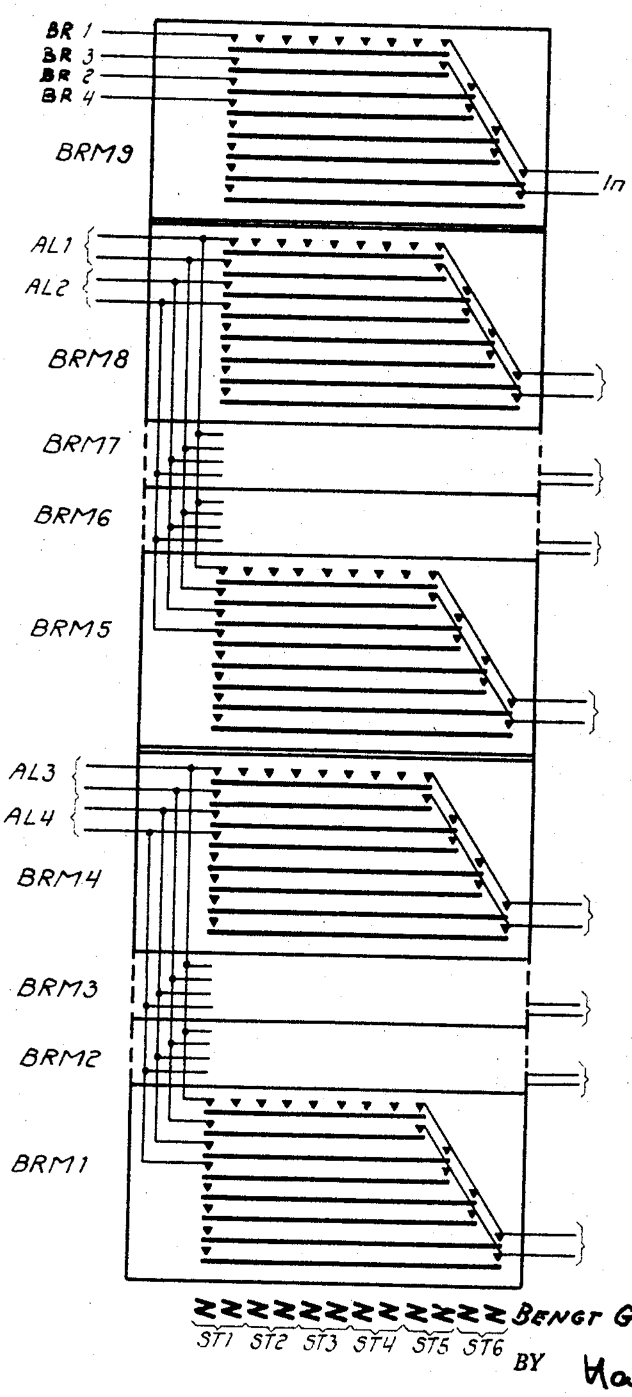
Figure 4:
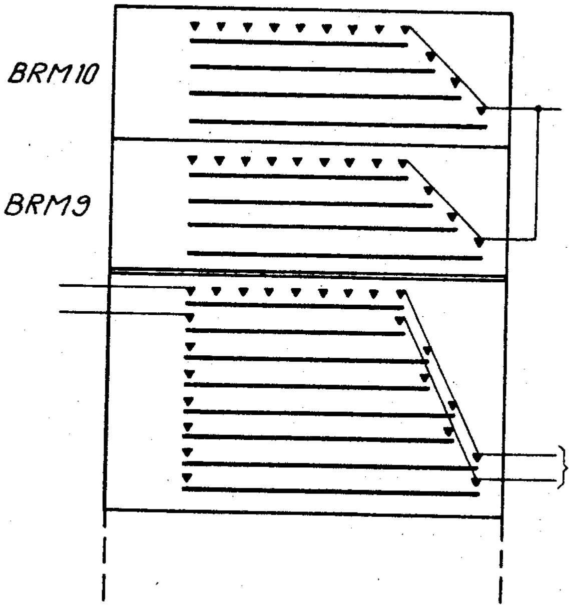

The invention will be further described in connection with the accompanying drawings, in which FIG. 1 shows, in the form of a simplified circuit diagram, an example of an earlier known arrangement for the control of cut-off relays in an automatic telephone exchange;

FIG. 2 shows, in the form of a simplified circuit diagram, an example of an arrangement according to the present invention, for the control of cut-off relays in an automatic telephone exchange; and FIGS. 3 and 4 show embodiments of the arrangement according to the invention incorporated in a selector network utilizing crossbar selectors, in an automatic telephone exchange.

FIG. 1 shows in the form of a simplified circuit diagram an example of an earlier known arrangement for the control of cut-off relays in an automatic telephone exchange. In the figure elements SLA and SLB are two selector stages which are integral parts of the selector network of a telephone exchange. The SLA stage is presumed to be the selecting stage in the selector network that lies nearest the line side. AB is a telephone set which, through its subscriber's line $L_a$, $L_b$, is connected to said telephone exchange. Cut-off relays and line relays belonging to the telephone set AB are indicated by reference characters BR and LR respectively. The control of the cut-off relay BR is arranged in such a way that a negative polarity signal is applied on a line *c* between the two selector stages SLA and SLB; this negative polarity signal remains on the line *c* as long as a conversation goes on. Because the cut-off relay control is performed by connecting the line *c* between the selector stages SLA and SLB to a negative signal pole, the selector stage SLA must be provided with a three-wire through connection. This gives rise to essential disadvantages not the least of which is reduced selector capacity at a given contact multiple field.

An example of an arrangement performed according to the present invention for the control of cut-off relays in an automatic telephone exchange is shown in the form of a simplified circuit diagram in FIG. 2. Again, elements SLA and SLB indicates two selector stages in an automatic telephone exchange, and correspond to the two selector stages with the same reference characters in FIG. 1. Element AB is in FIG. 2, just as in FIG. 1, a telephone set which, through its subscriber's line $L_a$, $L_b$, is connected to the selector stage SLA in the telephone exchange. Reference characters BR and LR indicate also in FIG. 2 the cut-off relay and the line relay respectively of the telephone set.

The line relay LR is connected in the same way in the arrangement according to the invention, FIG. 2, as in the earlier known arrangement, FIG. 1. On the other hand, the cut-off relay BR is connected differently. Accordingly, the control will be different. In the arrangement according to the invention the cut-off relay BR is, together with cut-off relays for several other telephone sets (not shown), connected to a special selector V and is controlled through this selector. Each cut-off relay is connected to its own output on the selector V, which consequently is common for the cut-off relays of an entire group, for instance 64 telephone sets. Furthermore the cut-off relay BR according to the invention consists of a socalled remanent or "latching" relay, that is a relay that is actuated by a current pulse of one direction and disconnected by a current pulse of opposite direction. Current pulses of different polarity can be obtained, for instance, from make contacts of a relay R through the selector V. The cut-off relay BR accordingly requires current only at the times of actuating and releasing, and requires no holding current. Thus, one and the same selector V can be used for the control of a number of cut-off relays BR. Since the cut-off relays BR are controlled by one additional selector V only a two-wire through connection will be necessary in the selector stage SLA. Accordingly, the drawback in form of diminished selector capacity, that is the case in the arrangement shown in FIG. 1, has been reduced to a great extent by the arrangement according to the invention. In spite of the additional selector V an important total multiple contact saving is obtained for the arrangement according to FIG. 2, especially arising from the time division operation of the selector in combination with the memory functions of the cut-off relays. These features make the alternative according to the invention essentially cheaper.

The arrangement according to the invention is preferably applicable to an electronically controlled automatic telephone exchange with a selector network which is built up of crossbar selectors with inverted bridge functions. In such an exchange the selector V in FIG. 2 consists of one, or perhaps two, bridge units in each crossbar selector unit connected to the SLA-stage.

FIG. 3 shows a form of embodiment of the arrangement according to the invention used in a crossbar selector intended for six selecting horizontals included in a selector network built up of crossbar selectors in an automatic telephone exchange. The exchange is presumed to be electronically controlled. The bridge function can for instance be inverted, that is the bridge magnets demand current only during the short time periods when the bridge control takes place.

The crossbar selector unit in FIG. 3 comprises six selecting horizontals ST1–6 and nine bridge units BRM1–9, of which one bridge unit, BRM9, is intended for cut-off relays control. The horizontals ST5 and ST6 of the six selecting horizontals are intended for so called level selection, that is for selecting pairs of contact bars in the birge unit, while the other horizontals ST1–4 are used in the usual way for pointing out the contact points. By using a so called level selection, each bridge unit in FIG. 3 can be divided up in four parts or "levels," and if the number of contact points in each level is eight, the total number of pairs of contact points in each bridge unit will be 32. If the SLA-stage in FIG. 2 is built up of crossbar selector units with level selection it should be theoretically possible to connect at a two-wire through connection 8×32 telephone sets to each crossbar selector unit. For traffic technical reasons it is, however, possible that each telephone set is available at more than one point in the SLA-stage. In FIG. 3 is presumed that each telephone set is connected to four places in the shown crossbar selector unit and the connection has occurred on similarly placed contact point pairs in four adjacent bridge units BRM1–4 or BRM5–8. Four subscribers' lines AL1–4 connected in this way are indicated in the figure. Consequently in total 64 telephone sets can be connected to the eight bridge units BRM1–BRM8.

The ninth bridge unit BRM9 in FIG. 3 is, as mentioned above, intended for cut-off relay control. The bridge unit BRM9 is in other words the special selector V shown in FIG. 2. By connecting the bridge unit BRM9 in the way shown in FIG. 3, it is possible to send control voltage to any of the 64 cut-off relays by connecting one or the other of the input lines I*n* of the bridge unit to a proper polarity source. These cut-off relays are of course allotted to the 64 telephone sets which are connected to the eight bridge units BRM1–8. Connection of the polarity source to the lower of the two input conductors I*n* makes it possible to control, for instance those cut-off relays which are allotted to the telephone sets connected to the bridge units BRM1–4, while connection of the polarity source to the upper input conductor makes it possible to control those cut-off relays, which are allotted to the telephone sets connected to the bridge units BRM5–8. In FIG. 3 four outputs BR1–4 from the bridge unit BRM9 are indicated. These outputs are connected to the cut-off relays, which are allotted to the subscriber's lines AL1–4. Said connection of one or the other of the two input lines I*n* of the bridge unit BRM9 to the polarity source occurs for instance by aid of a reed relay. This reed relay is not shown in FIG. 3 but corresponds to the relay R in FIG. 2. As the telephone exchange, of which the crossbar selector unit shown in FIG. 3 is an integral part, is presumed to be electronically controlled, there is in the data part of the exchange information about where in the SLA-stage the telephone set is connected and the cut-off relay of which shall be actuated. If the telephone set is connected to more than one place of the SLA-stage the information refers to the connection, which shall be used in a certain case. This information comprises for instance the number of the crossbar selector unit in the SLA-stage, the number of the horizontal- and bridge magnets, which are to be actuated, and also the information indicating which of the two input lines of the ninth bridge unit will be connected to the polarity source.

From what has been said above is clear that in the cited example the ninth bridge unit, BRM9 in FIG. 3, can be used for control of all the 64 cut-off relays. This means, however, that the bridge unit BRM9 must work every time a through connection of the subscriber's line is made in some of the other bridge units BRM1–8. Such a condition can make great demands upon the bridge unit BRM9 as regards the length of life. In order to ease these demands the arrangement according to the invention can be modified according to FIG. 4. Instead of using only one bridge unit for the control of the cut-off relays, two bridge units BRM9 and BRM10 are used. Each bridge unit is connected as a 1-pole 4 level selector with a hunting capacity 32. The inputs of the bridge units can suitably be connected together and is thus connected to the polarity source at the same time. Which one of the 64 cut-off relays that shall be actuated is then determined by selection with horizontal and bridge magnets. In principle this means that in the case of two bridge units for the control of the cut-off relays each bridge unit needs to work only half as often as one single bridge unit intended for the control of the cut-off relay. Furthermore the number of contact springs will be the half when using two bridge units, and this means an increased life.

I claim:

1. In an automatic telephone system including at least a plurality of telephone sets and a selector network including at least a selector stage connectable via lines to the telephone sets wherein said selector stage is controllable to establish connections for speech branches, the combination comprising a cut-off relay, in said selector network, associated with each of said telephone sets, each of said cut-off relays being of the remanent type, a source of controlled current pulses for operating said relays and a cut-off relay selector controllable in synchronism with said selector stage for connecting a selected cut-off relay to said source of controlled current pulses.

2. The combination as claimed in claim 1 wherein said selector stage is a cross bar selector unit, including selecting horizontals and bridge units and said cut-off relay selector is an addition bridge unit in said cross bar selector unit.

References Cited

UNITED STATES PATENTS 2,921,140 1/1960 Abbott ------------- 179—16

KATHLEEN H. CLAFFY, *Primary Examiner.*

LAURENCE A. WRIGHT, *Assistant Examiner.*